(12) United States Patent
Chen et al.

(10) Patent No.: US 7,372,809 B2
(45) Date of Patent: May 13, 2008

(54) THWARTING DENIAL OF SERVICE ATTACKS ORIGINATING IN A DOCSIS-COMPLIANT CABLE NETWORK

(75) Inventors: John Anthony Chen, Ashburn, VA (US); Kenneth Gould, Oakton, VA (US)

(73) Assignee: Time Warner Cable, Inc., Stamford, CT (US)

( * ) Notice: Subject to any disclaimer, the term of this patent is extended or adjusted under 35 U.S.C. 154(b) by 758 days.

(21) Appl. No.: 10/848,397

(22) Filed: May 18, 2004

(65) Prior Publication Data
US 2005/0259645 A1    Nov. 24, 2005

(51) Int. Cl.
*H04J 1/16* (2006.01)
(52) U.S. Cl. ................ 370/229; 370/389; 370/401; 370/392
(58) Field of Classification Search ........ 370/229–235, 370/389, 392, 401, 464
See application file for complete search history.

(56) References Cited

U.S. PATENT DOCUMENTS

| | | | |
|---|---|---|---|
| 2002/0101819 A1* | 8/2002 | Goldstone | 370/229 |
| 2004/0123142 A1* | 6/2004 | Dubal et al. | 713/201 |
| 2005/0044352 A1* | 2/2005 | Pazi et al. | 713/153 |
| 2006/0031575 A1* | 2/2006 | Jayawardena et al. | 709/239 |
| 2006/0156404 A1* | 7/2006 | Day | 726/23 |

OTHER PUBLICATIONS

"Denial of Service Attacks Using Nameservers" CERT Coordination Center. CERT Incident Note (IN-2004-04), Pittsburgh, U.S.A. Apr. 28, 2000; http://www.cert.org/incident_notes/IN-2000-04.html.

(Continued)

*Primary Examiner*—Firmin Backer
*Assistant Examiner*—Nguyen Ngo
(74) *Attorney, Agent, or Firm*—Roberts Mardula & Wertheim, LLC

(57) ABSTRACT

Methods and systems for thwarting denial of service attacks originating in a DOCSIS-compliant cable network (DCN) are described. A DCN comprises one or more sub-networks each comprising an access network, one or more cable modem termination systems (CMTSs) and one or more cable modems (CMs). The DCN also accesses an edge server and a local DNS cache server. The DCN interfaces with the Internet and accesses a remote DNS server according to well-known protocols. The CMTS is adapted to compare the source IP address included in IP packet headers to the IP address of the customer premises equipment (CPE) from which the IP packet originates as assigned by the DNS. Data packets that have spoofed addresses are either deleted or quarantined. Packets reaching the edge server are evaluated by an attack detection system. A packet determined to be part of a denial of service attack is inspected and the source IP address and the destination IP address extracted. A cache controller is instructed to prevent a DNS cache server from responding to a domain name request containing both the extracted source IP address and destination IP address.

18 Claims, 8 Drawing Sheets

OTHER PUBLICATIONS

"SYN Flooding and IP Spoofing Attacks" CERT Coordination Center. CERT Advisory (CA-1996-21 TCP), Pittsburgh, U.S.A. Sep. 19, 1996; http://www.cert.org/advisories/CA-1996-21.html.
"DNS Security Considerations and the Alternatives to BIND", by Lim Seng Chor, SANS Institute, vol. 1, Oct. 2, 2001.
"Bound by Tradition: A Sampling of the Security Posture of the Internet's DNS Servers", by Mike Schiffman, Feb. 2003.
"Network Ingress Filtering: Defeating Denial of Service Attacks which Employ IP Source Address Spoofing", by P. Ferguson and D. Senie, The Internet Society, May 2000; RFC 2827.
"Dynamic Updates in the Domain Name System (DNS Update)", by P. Vixie, et. al., Apr. 1997; RFC 2136.
"Domain Names—Concepts and Facilities", by P. Mockapetris, Nov. 1987; RFC 1034.

* cited by examiner

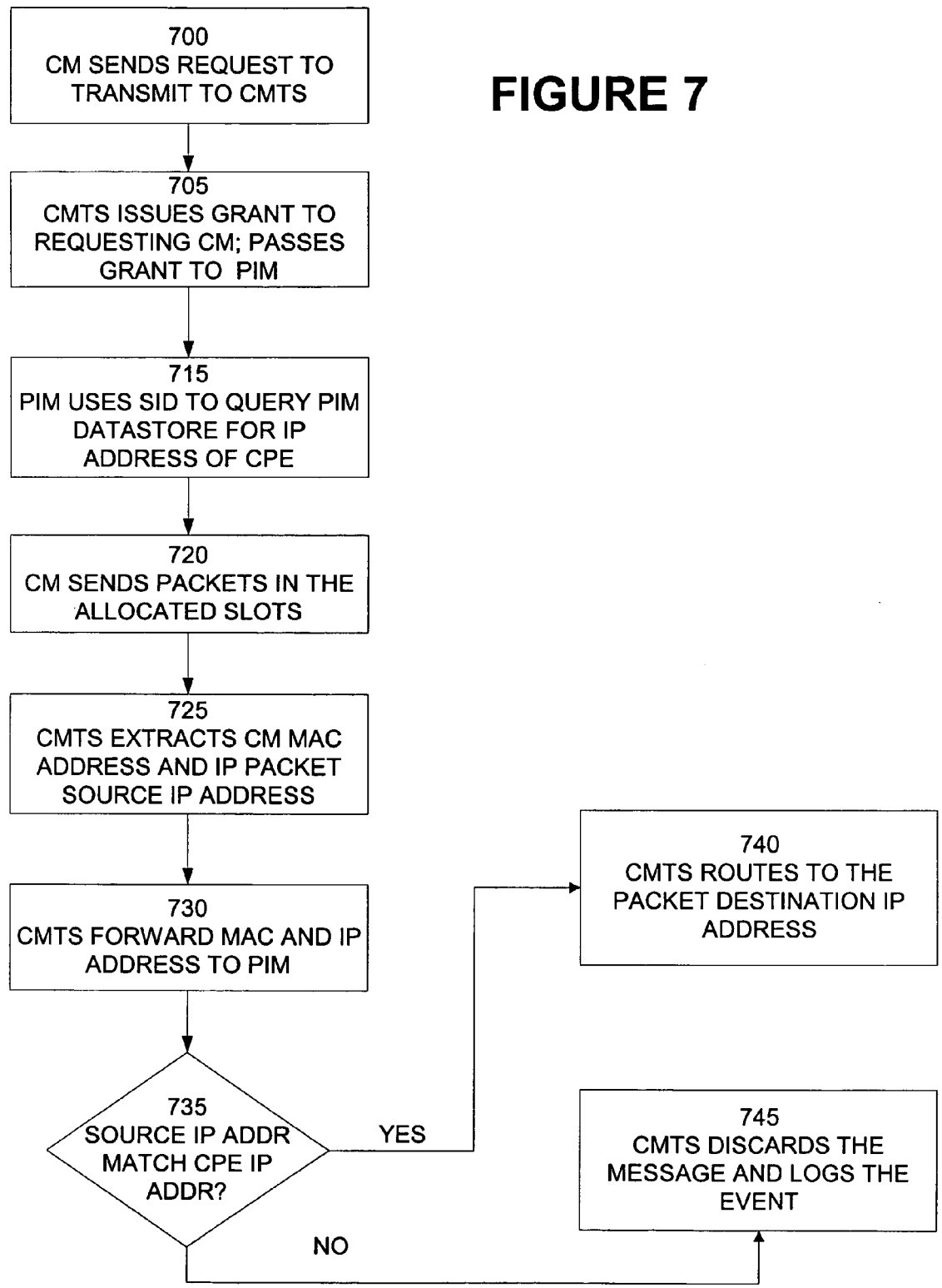

THWARTING DENIAL OF SERVICE ATTACKS ORIGINATING IN A DOCSIS-COMPLIANT CABLE NETWORK

BACKGROUND

Embodiments of the present invention relate to systems and methods for thwarting denial of service attacks originating in a DOCSIS-compliant cable network. Particular systems and methods are directed to detecting "spoofed" source IP addresses in messages sent from cable modems and to metering DNS queries from specific source IP addresses in a cable network environment.

The Internet, also termed the "information superhighway", has revolutionized how data and information can be accessed. Presently, "online" information sources mirror most of the information available from traditional sources such as newspapers, reference books, databases and other public information sources. Users are also able to subscribe to private information sources, order goods and services and download information content and receive radio and television transmissions. Communication between users is also available and includes "chat" rooms, semi-private virtual area networks, telephone service (termed voice over Internet protocol or VoIP) and online competitive video gaming.

As uses of the Internet increase, users seek faster connection speeds and greater bandwidth. Data over cable networks are becoming a preferred solution in providing high data transfer rates to users at attractive pricing. At increased bandwidth, user enjoyment is enhanced with shorter wait and download times.

Users select the Internet websites they wish to connect to by identifying the website by its Internet Protocol (IP) address or its domain name. Most users prefer using domain names instead of the IP address. Primary amongst the reasons for this preference is the ease of remembering domain names and the implementation of dynamically assigned Internet addresses to particular domain names.

A DNS server receives a name from a user, associates the name with an IP address, and sends the IP address to the user. The user then communicates with a server via the server's IP address. If a DNS server does not know the address associated with a particular name, the DNS server contacts a root name server. A root server "knows" the IP address for all of the DNS servers that handle the top-level domains. For example, a DNS server might "ask" a root server for the IP address associated with www.Yahoo.com, and the root might "respond" (assuming no caching), "I don't know the IP address for Yahoo.com, but here's the IP address for the COM name server." Of the various software available for operating a DNS server, most common is the UNIX based Berkeley Internet Name Domain (BIND) software.

While DNS makes the Internet more user friendly, DNS servers are used by malicious attackers bent on disrupting normal communications over the Internet. Such attacks are generally referred to as denial of service (DoS) attacks. While some DoS attacks do not involve DNS servers directly (e.g., attacks that exploit implementation bugs and attacks that exploit legitimate protocol features of an Internet service), attacks on server bandwidth use the DNS to congest a target's networks with (useless) traffic. The high volume of incoming DNS requests can cause routers to crash, compounding the problem. Some bandwidth attacks generate easily identifiable packets that can be filtered or rate-limited because they never occur in high volume during normal operations. Other bandwidth attacks may look like transient high volume traffic.

To be effective, bandwidth attacks require a group of attackers to cooperate in order to generate sufficient traffic. A variant of the DoS is the "distributed" DoS or "DDoS." An attacker using this form of attack breaks into hundreds or thousands of computers connected to the Internet and installs software on them that allows the attacker to control all the captured computers. The attacker then launches coordinated attacks on a target site by issuing a single command to the captured machines instructing them to launch a particular attack against a specific target. When the attacker decides to stop the attack, another single command is sent. These attacks typically exhaust bandwidth, router processing capacity, or network stack resources, breaking network connectivity to the targets.

Tracing the origins of a DoS attack is difficult to say the least. Devices on the Internet are identified via IP addresses. IP addresses are structured (organized into groups) so that special-purpose traffic-handling computers, called routers, can direct messages (in the form of packets) in the right direction to reach their intended destination. Each of these packets is handled separately by the Internet and reassembled at the remote computer. Each of these packets has a pair of addresses in it, called the source and destination IP addresses. These are the addresses of the originating machine, and the recipient. They are analogous to the address and return address on an envelope, in traditional mail.

When a packet is sent over the Internet, it is passed first to the nearest router; commonly this router is at the point where the local network connects to the Internet. This router is often called a border router. The border router passes it upstream to a core router, which interconnects with many other core routers all over the Internet; the core routers pass the packet on until it reaches its destination as determined by the destination IP address. The source IP address is normally ignored by routers.

A router necessary "knows" the addresses of every network attached to it, so that it can correctly route packets to them. In a DDoS attack, the source addresses is forged or "spoofed." The border router, the first router to receive a packet, is in a position to look at the source address, determine whether it matches the network it's coming from, and, if not, discard the packet. However, if the packet is forwarded by the border server, downstream servers will not be able to detect the forged source IP address and the attack will be all but unstoppable.

A DNS server offers an attacker a convenient means for executing a packet flooding denial of service attacks. An attacker sends a large number of UDP-based DNS requests to a DNS server using a spoofed source IP address. Any DNS server response is sent back to the spoofed IP address as the destination. In this scenario, the spoofed IP address represents the target of the denial of service attack. The DNS server is an intermediate party in the attack. The true source of the attack is difficult for an intermediate or a target site to determine due to the use of spoofed source addresses. Because DNS server responses can be significantly larger than DNS requests, there is potential for bandwidth amplification. In other words, the responses may consume more bandwidth than the requests. An intruder may use multiple DNS servers on diverse networks in this type of an attack to achieve a DDoS attack against target sites.

An intermediary DNS server may receive packets back from the target. In particular, port unreachable packets may be returned from the target to the intermediary in response to an unexpected UDP packet sent from the intermediary DNS server to the target host. Sites with DNS servers used as intermediaries may experience performance degradation and a denial of DNS service as a result of an increase in DNS query traffic. It is also possible to experience higher bandwidth consumption and a bandwidth denial of service attack on the intermediary DNS server's network. Target sites may experience a bandwidth denial of service attack due to a high volume of DNS response packets being forwarded by one or more intermediary DNS servers.

Spoofing is also employed in attacks that exploit the hand-shake mechanism used by the transmission control protocol (TCP). TCP enables two hosts to establish a connection and exchange streams of data. TCP guarantees delivery of data and also guarantees that packets will be delivered in the same order in which they were sent. Any system connected to the Internet and providing TCP-based network services, such as a Web server, FTP server, or mail server, is potentially subject to an attack that exploits the TCP handshake. A TCP connection starts with a client sending a SYN message to a server, indicating the client's intention to establish a TCP connection. The server replies with a SYN/ACK message to acknowledge that it has received the initial SYN message, and at the same time reserves an entry in its connection table and buffer space. After this exchange, the TCP connection is considered to be half open. To complete the TCP connection establishment, the client must reply to the server with an ACK message. In a TCP SYN flooding attack, an attacker, sends many SYN messages, with fictitious (spoofed) IP addresses, to a single server (target). Although the server replies with SYN/ACK messages, these messages are never acknowledged by the client. The half-open connections data structure on the target server system will eventually fill until server is unable to accept any new incoming connections. While a timeout can be associated with a pending connection to expire half-open connections, the attacking system can simply continue sending IP-spoofed packets requesting new connections faster than the victim system can expire the pending connections. In most cases, the victim of such an attack will have difficulty in accepting any new incoming network connection. In these cases, the attack does not affect existing incoming connections nor the ability to originate outgoing network connections.

In a variation of the TCP SYN flooding attack, the spoofed source address is a real address and is the target (or a second target) of the attack. The ACK messages from the first target server are sent to the address of the second target server, overwhelming the second target with message traffic requiring that it send an ACK message. The second target server's resources are ultimately consumed disrupting its operation.

The location of the attacking system is obscured because the source addresses in the SYN packets are often implausible. When the packet arrives at the victim server system, there is no way to determine its true source. Since the network forwards packets based on destination address, the only effective way to validate the source of a packet is to use input source filtering. This can be accomplished by checking whether the "AWK" bit is set in the header. If the packet is a first packet, the AWK bit is not set. If the packet is a response packet, the AWK bit in the head is set.

Another attack form that relies on spoofing of the source IP address uses user datagram protocol (UDP) packets in place of TCP packet. TCP is the protocol most commonly used for services on the Internet. For example, Telnet, FTP, SMTP, NNTP, and HTTP are all TCP-based services. TCP is reliable in that it makes three guarantees to the application layer: the destination will receive the application data in the order it was sent, the destination will receive all the application data, and the destination will not receive duplicates of any of the application data. TCP is bi-directional in that once a connection is established, a server can reply to a client over the same connection. By contrast, UDP is a low-overhead alternative to TCP because it makes none of the reliability guarantees made by TCP (delivery, ordering, and nonduplication) and doesn't require reliability mechanisms to support it. Every UDP packet is independent, which means that unlike TCP, UDP packets are not part of a "virtual circuit."

UDP packets are very similar to TCP packets in structure. A UDP header contains UDP source and destination port numbers, just like the TCP source and destination port numbers. However, a UDP header does not contain an ACK bit and does not use the SYN/ACK handshake. There is no way for a packet filtering router to determine, simply by examining the header of an incoming UDP packet, whether that packet is a first packet from an external client to an internal server, or a response from an external server back to an internal client.

In a UDP-based attack, an intruder sends a large number of UDP-based DNS requests to a DNS server using a spoofed source IP address. Any DNS server response is sent back to the spoofed IP address as the destination. In this scenario, the spoofed IP address represents the victim of the denial of service attack. The DNS server is an intermediate party in the attack. The true source of the attack is difficult for an intermediate or a victim site to determine due to the use of spoofed source addresses. As noted earlier, because DNS server responses can be significantly larger than DNS requests, there is potential for bandwidth amplification. In other words, the responses may consume more bandwidth than the requests.

Multiple DNS servers on diverse networks can be used in this type of an attack to achieve a distributed denial of service attack against victim sites. UDP DNS queries can be crafted to request the same valid DNS resource record from multiple DNS servers. The result is many DNS servers receiving queries for resources records in zones for which the DNS server is not authoritative. The response of the DNS server depends on its configuration. If the target DNS server allows the query and is configured to be recursive or to provide referrals, the DNS server's response could contain significantly more data than the original DNS request, resulting in a higher degree of bandwidth amplification. A target DNS server configured without restrictions on DNS query sources may not log malicious queries at all.

The intermediary DNS server may receive packets back from the victim host. In particular, ICMP port unreachable packets may be returned from the victim to the intermediary in response to an unexpected UDP packet sent from the intermediary DNS server to the victim host. Sites with DNS servers used as intermediaries may experience performance degradation and a denial of DNS service as a result of an increase in DNS query traffic. It is also possible to experience higher bandwidth consumption and a bandwidth denial of service attack on the intermediary DNS server's network. Victim sites may experience a bandwidth denial of service attack due to a high volume of DNS response packets being forwarded by one or more intermediary DNS servers.

Cable networks have become popular means for high-speed data connections to the Internet. Cable networks that comply with Data Over Cable Service Interface Specification (DOCSIS) standards (DOCSIS version 1.0 was issued in 1997 and DOCSIS version 1.1 replaced version 1.0 in 1999-2001) offer connectivity through a cable modem (CM) that is managed and monitored by a cable modem termination system (CMTS). One advantage of a DOCSIS-compliant network (DCN) is that the IP address of the CM and the IP addresses of other devices connected to the CM are issued by systems under the control of the DNS.

It is desirable to implement systems and methods to thwart DoS attacks that originate from within a DCN by detecting "spoofed" source IP addresses in messages sent from cable modems and by metering DNS queries from specific source IP addresses within a DCN. As is demonstrated below, applicants have developed such systems and methods that have additional benefits of reducing cable network load factors and reducing the potential that packets originating from the DCN will be blocked by other Internet service providers.

SUMMARY

Embodiments of the present invention provide systems and methods to thwart DoS attacks that originate from within a DCN. In an embodiment of the present invention, a DCN comprises one or more sub-networks each comprising an access network, one or more cable modem termination systems (CMTSs) and one or more cable modems (CMs). The DCN also accesses an edge server and a local DNS cache server. The DCN interfaces with the Internet and accesses a remote DNS server according to well-known protocols. In this embodiment, the CMTS is adapted to compare the source IP address included in IP packet headers to the IP address of the customer premises equipment (CPE) from which the IP packet originates as assigned by the DCN. Data packets that have spoofed addresses are either deleted or quarantined. Packets reaching the edge server are evaluated by an attack detection system. A packet determined to be part of a denial of service attack is inspected and the source IP address and the destination IP address extracted. A cache controller is instructed to prevent a DNS cache server from responding to a domain name request containing both the extracted source IP address and destination IP address. .

In another embodiment of the present invention, a quarantined source IP address is allowed to make unrestricted requests to the DNS cache server on a "probationary" basis subject to monitoring of domain name request directed to the domain name that caused the IP address to be quarantined.

It is therefore an aspect of the present invention to detect spoofed source IP address in packets originating from a CPE.

It is another embodiment of the present invention to eliminate and/or quarantine packets with spoofed source IP addresses originating from a CPE.

It is yet another embodiment of the present invention to limit the number of DNS requests that can originate from a CPE IP address on a DNS network.

It is a further aspect of the present invention to monitor DNS request message traffic originating from a specific IP address assigned to a CPE.

It is yet another aspect of the present invention to measure the rate at which DNS request messages originate from a specific IP address assigned to a CPE.

It is still another aspect of the present invention to take remedial action when the rate of DNS request messages originating from a specific IP address assigned to a CPE exceeds a pre-determined limit (a DNS request message rate threshold).

These and other aspects of the present invention will become apparent from a review of the general and detailed descriptions that follow.

In an embodiment of the present invention, a method for thwarting a denial of service attack originating from a DOCSIS-compliant cable network (DCN) is provided. The occurrence of a denial of service attack against a target originating from a customer premises equipment (CPE) connected to the DNS is detected. A source IP address of the CPE and a domain name of the target are captured. A DNS cache server is directed to ignore a domain name request from the CPE source IP address that is directed to the target domain name thereby thwarting the denial of service attack.

In another embodiment of the present invention, an alternate method for thwarting a denial of service attack originating from within DCN is provided. A determination is made whether a source IP address of a packet originating from a CPE connected to the DCN is authorized. According to embodiments of the present invention, determining whether a source IP address is authorized is accomplished by identifying a cable modem to which the CPE is connected. The assigned CPE IP address is associated with the cable modem to which the CPE is connected. A determination is made whether the packet source IP address matches the assigned CPE IP address. In the event the packet source IP address matches the assigned CPE IP address, the packet source IP is authorized.

In the event the packet source IP address is authorized, the occurrence of a denial of service attack against a target originating from the CPE is detected. The packet source IP address and a domain name of the target are captured. A DNS cache server is directed to ignore a domain name request from the packet source IP address that is directed to the target domain name thereby thwarting the denial of service attack. In the event the packet source IP address does not match the assigned CPE IP address, a determination is made that the packet source IP address is unauthorized. All packets having the unauthorized packet source IP address are discarded.

In yet another embodiment of the present invention, a system for thwarting a denial of service attack originating from within a DOCSIS-compliant cable network (DCN) comprises a CPE connected to a DCN, means for identifying a packet used to perpetrate a denial of service attack originating from within the DCN and identifying a packet source IP address and capture a target site IP address in the attack packet, and a cache controller connected to a DNS cache server and responsive to an attack detection system. A DNS cache server responds to a domain name request from a customer premises equipment (CPE) connected to the DCN. A cache controller connected to the DNS cache server and responsive to the attack detection system is adapted to instruct the DNS cache server to ignore a domain name request packet having the packet source IP address and the target site IP address. The system may further comprise means to identify a cable modem to which the CPE is connected, means for associating an assigned CPE IP address with the cable modem to which the CPE is connected, means to determine whether the source IP address of a packet originating from the CPE matches the assigned CPE IP address, and means to discard a packet in the event the packet source IP address does not match the assigned CPE IP address.

In still another embodiment of the present invention, a method for limiting domain name service (DNS) request messages originating from a DCN is provided. A DNS request message directed to a domain name from a CPE is received and the source IP address of the CPE from the DNS request message is obtained. A DNS request message transmission rate for DNS request messages directed to the domain name from the source IP address is calculated. The DNS request message transmission rate is compared to a threshold message transmission rate. In the event the DNS request message transmission rate exceeds a threshold message transmission rate, remedial action is taken.

In one embodiment of the present invention, a message transmission rate for the source IP address is calculated by time-stamping a first DNS request message and a last DNS request message directed to the domain name from the source IP address. The DNS request messages received from the source IP inclusive of the first DNS request message directed to the domain name and the last DNS request message directed to the domain name are counted. An elapsed time segment between the first and last DNS request messages is determined by computing the difference between the time-stamp of the last DNS request message and the first DNS request message. A message transmission rate for the source IP address is calculated by dividing the DNS request message count by the elapsed time segment.

In another embodiment of the present invention, a message transmission rate for the source IP address is determined by counting the DNS request messages directed to the domain name received from the source IP address during a clock interval. The message transmission rate is equal to the message count.

In still another embodiment of the present invention, a system for thwarting a denial of service attack originating from within a DCN comprises a CPE connected to a DCN, an edge server, and a cache controller connected to a DNS cache server and responsive to an attack detection system. The attack detection system is adapted to identify a packet used to perpetrate a denial of service attack originating from within the DCN and to capture a packet source IP address and a target site IP address in the attack packet. A DNS cache server responds to a domain name request from a customer premises equipment (CPE) connected to the DCN. An edge server receives an IP packet from the CPE that is destined for delivery to a site connected to the Internet, wherein the site is identified by a domain name associated with a unique IP address. A cache controller connected to the DNS cache server and responsive to the attack detection system is adapted receive from the attack detection system the source IP address of the CPE and the target domain name and to instruct the DNS cache server to ignore a domain name request packet having the packet source IP address and the target site IP address.

Further details relating to embodiments of the present invention will become clear from a review of the general and detailed descriptions that follow.

DESCRIPTION OF THE DRAWINGS

FIG. 7 illustrates a general flow of a method of identifying spoofed IP source addresses in upstream packets using data acquired from a time slot grant according to embodiments of the present invention.

DETAILED DESCRIPTION

The following terms used in the description that follows. The definitions are provided for clarity of understanding:

| | |
|---|---|
| CM - | a cable modem. |
| CMTS - | a cable modem termination system. |
| CPE - | customer premises equipment. |
| DCN - | digital cable network. |
| DHCP server - | a dynamic host configuration protocol server. |
| DOCSIS - | "Data Over Cable Service Interface Specification" issued by Cable Television Laboratories, Inc. |
| ISP - | an Internet service provider (ISP). |
| MAC address - | the media access controller address of a network device. |
| MSO - | multiple service operation. |
| Spoofing - | changing the IP address in an Internet data packet to an IP address not associated with the device from which the packet originates. |
| TCP - | transmission control protocol. |
| TDMA - | time division multiple access. |
| URL - | universal resource locator. |
| VoIP- | voice over IP. |

Embodiments of the present invention provide systems and methods to thwart DoS attacks that originate from within a DCN. In an embodiment of the present invention, a DCN comprises one or more sub-networks each comprising an access network, one or more cable modem termination systems (CMTSs) and one or more cable modems (CMs). The DCN also accesses an edge server and a local DNS cache server. The DCN interfaces with the Internet and accesses a remote DNS server according to well-known protocols. In this embodiment, the CMTS is adapted to compare the source IP address included in IP packet headers to the IP address of the customer premises equipment (CPE) from which the IP packet originates as assigned by the DCN. Data packets that have spoofed addresses are either deleted or "quarantined." Packets reaching the edge server are evaluated by an attack detection system. A packet determined to be part of a denial of service attack is inspected and the source IP address and the destination IP address extracted. A cache controller is instructed to prevent a DNS cache server from responding to a domain name request containing both the extracted source IP address and destination IP address.

In another embodiment of the present invention, a source IP address associated with a denial of service attack is "quarantined" such that the quarantined IP address may be used to make unrestricted requests to the DNS cache server on a "probationary" basis subject to monitoring of domain name requests directed to the domain name that caused the IP address to be quarantined.

Figure 1:
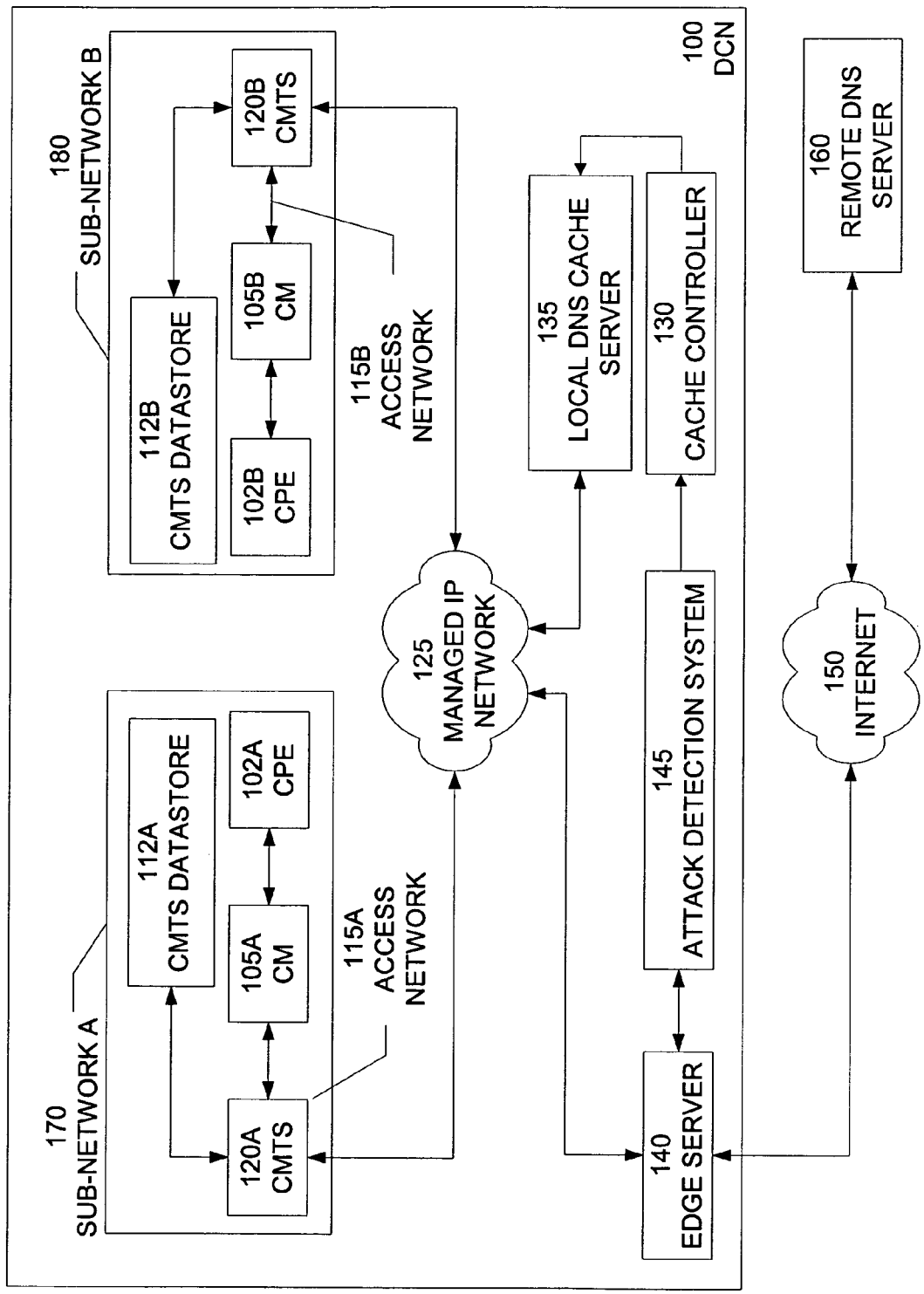
FIG. 1 illustrates the network components of a DCN according to embodiments of the present invention.

FIG. 1 illustrates the network components of a DCN according to embodiments of the present invention. Referring to FIG. 1, a DCN 100 comprises sub-networks A and B (170 and 180 respectively). A sub-network A 170 comprises an access network 115A, a cable modem termination system (CMTS) 120A, and a CM 105A. The access network 115A connects a subscriber's cable modem (CM) 105A to the CMTS 120A at the cable headend. The CM 105A supports connection of a CPE 102A to access network 115A, a managed IP network 125, and the Internet 150. Also connected to CMTS 120A is a CMTS datastore 112A.

A sub-network B 180 comprises an access network 115B, a cable modem termination system (CMTS) 120B, and a CM 105B. The access network 115B connects a subscriber's cable modem (CM) 105B to the CMTS 120B at the cable headend. The CM 105B supports connection of a CPE 102B to access network 115B, a managed IP network 125, and the Internet 150. Also connected to CMTS 120B is a CMTS datastore 112B.

FIG. 1 further illustrates local DNS cache server 135 and the edge server 140. Edge server 140 is linked to attack detection system 145. In an embodiment of the present invention, attack detection system 145 uses network statistical data to identify anomalies in the IP traffic at the edge server 140 that are indicative of a denial of service attack. By way of illustration and not as a limitation, attack detection system 145 comprises a server running a Peak Flow™ application developed by Arbor Networks, Inc. Also illustrated is a remote DNS server 160 that is connected to the Internet 150.

The edge server 140 routes packets directed to the DCN 100 from the Internet 150 and packets originating from the DCN 100 to the Internet (egress packets). Linked to edge server 140 is attack detection system 145 that monitors egress packets and determines whether a DoS attack has been initiated on DCN 100. Attack detection system 145 is also connected to local DNS cache server 135 through cache controller 130. As will be described in detail below, cache controller 130 allows the attack detection system 145 to manage a DoS attack originating from inside DCN 100 by controlling the DNS response messages sent by local DNS cache server 135.

Local DNS cache server 135 provides means for storing recently accessed Internet websites and their IP addresses. When a domain name request is made for a remote Internet website, the request is first sent to a local DNS cache server 135. Local DNS cache server 135 looks to see if the remote Internet website is already listed in its cache. If this is the case, a local DNS cache server 135 responds with the IP address. Only if the remote Internet website is not listed in the cache is a domain name request forwarded to remote DNS server 160. The response from remote DNS server 160 is then added, on a temporary basis, to local DNS cache server 135. In this manner data traffic between the cable network and remote networks is reduced.

While FIG. 1 illustrates a single local DNS caching controller 130, a single local DNS cache server 135, a single edge server 140, and a single remote DNS server 160, this is not meant as a limitation. As will be apparent to those skilled in the art, multiple instances of these components may be deployed or accessed by a DNS to provide services to subscribers, to enhance security, and to provide for back-up in the event of component failure or maintenance. Additionally, while cache controller 130, local DNS cache server 135, edge server 140 and attack detection system 145 are illustrated as discrete components, the functions of these components may be combined or incorporated into a single device or integrated into other network components without departing from the scope of the present invention.

DCN users transmit to, and receive data from, Internet websites. Such websites are directly accessed using their associated IP address or, in the alternative, by using their associated universal resource locator (URL) or domain name. A URL is the address of a file (resource) accessible on the Internet. The complete URL contains the name of the protocol required to access the resource, a domain name that identifies a specific computer on the Internet, and a hierarchical description of a file location on the computer.

For example, a popular URL is http://www.uspto.gov and designates the home page of the US Patent and Trademark Internet website having the domain name of www.uspto.gov. URLs are more convenient to use than an IP address such as 12.92.116.135. Further, URLS are often referenced to dynamically assigned IP addresses.

When a DCN user enters a domain name or URL in a DNS-enabled software client, such as a browser, the software client generates a domain name request message. The desired response to such a request message is the IP address associated with the entered domain name or URL. In the above example, entering either www.uspto.gov or http://www.uspto.gov will cause the DNS server to return the IP address 12.92.116.135 to the software client. The software client then creates a message using the IP address returned by the DNS server as the destination IP address.

The operator of a DCN not only desires to provide service to its subscribers but to prevent the resources of the DCN from being used, intentionally or unwittingly, to mount a DoS attack. Use of a DCN for DoS attacks consumes bandwidth, affects the reputation of the operator, and risks a loss of connectivity with other sites that filter communications from networks that are used to mount a DoS attack. Fortunately, various relationships between the CMTS, the CM, and the CPEs attached to the CM are established during registration of the CM and during the assignment of IP addresses to the CPEs connected to the CM. These relationships are used to invoke the preventive measures reflected in the embodiments of the present invention.

Figure 2:
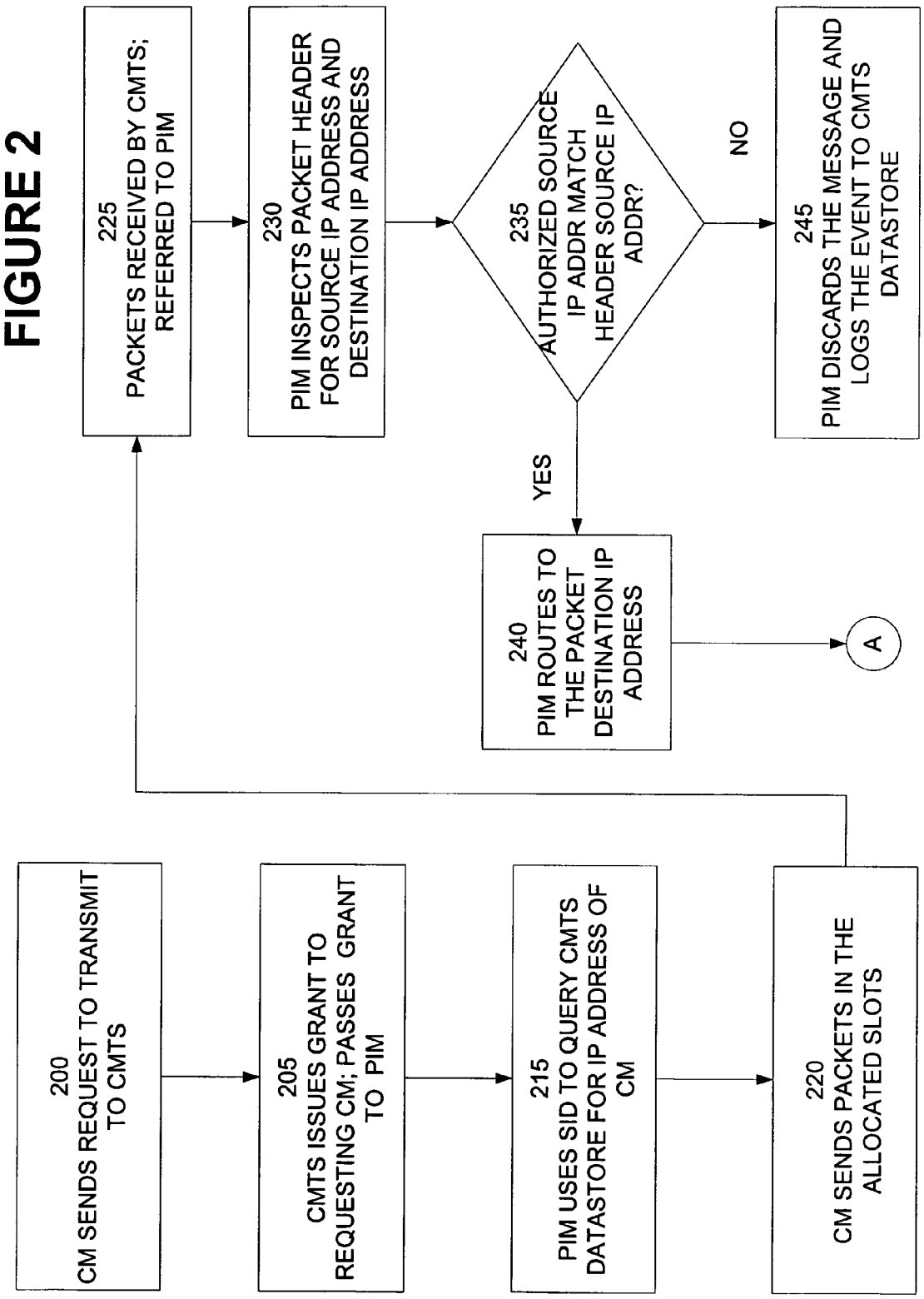
FIG. 2 illustrates the flow of a CPE DHCP request/offer/acceptance exchange in a DCN according to embodiments of the present invention.

FIG. 2 illustrates the flow of a CPE DHCP request/offer/acceptance exchange in a DCN according to embodiments of the present invention. A DHCP request is sent by CPE connected to a CM to acquire a public IP address. Referring to subnetwork A 170 of FIG. 1 and to FIG. 2, CPE (102A) sends a CPE DHCP request comprising the MAC address of the CPE and the MAC address of the CM to which the CPE is connect to the CMTS (120A) 200. The CMTS (120A) forwards the CPE DHCP request to a CPE DHCP server (not illustrated) 210. The DHCP Server sends an offer to the CMTS (120A) comprising a public IP address for the CPE (102A) 215. The CMTS (120A) forwards the offer to the CPE (102A) 220. The CPE (102A) sends an acceptance of the offer to the CMTS (120A) 225. The CMTS (120A) associates the CPE MAC address and the newly assigned CPE IP address with the MAC address of the CM (105A) to which the CPE (102A) is connected.

In an embodiment of the present invention, the association between the CPE MAC address and CPE IP address with the MAC address of the CM to which the CPE (102A) is connected is stored in CMTS datastore 112A.

As will be apparent to those skilled in the art, a CM may be connected to multiple CPEs each of which will be assigned a unique CPE IP address that is associated with the CM to which it is connected. In an embodiment, the CPE is a general-purpose computer.

Figure 3:
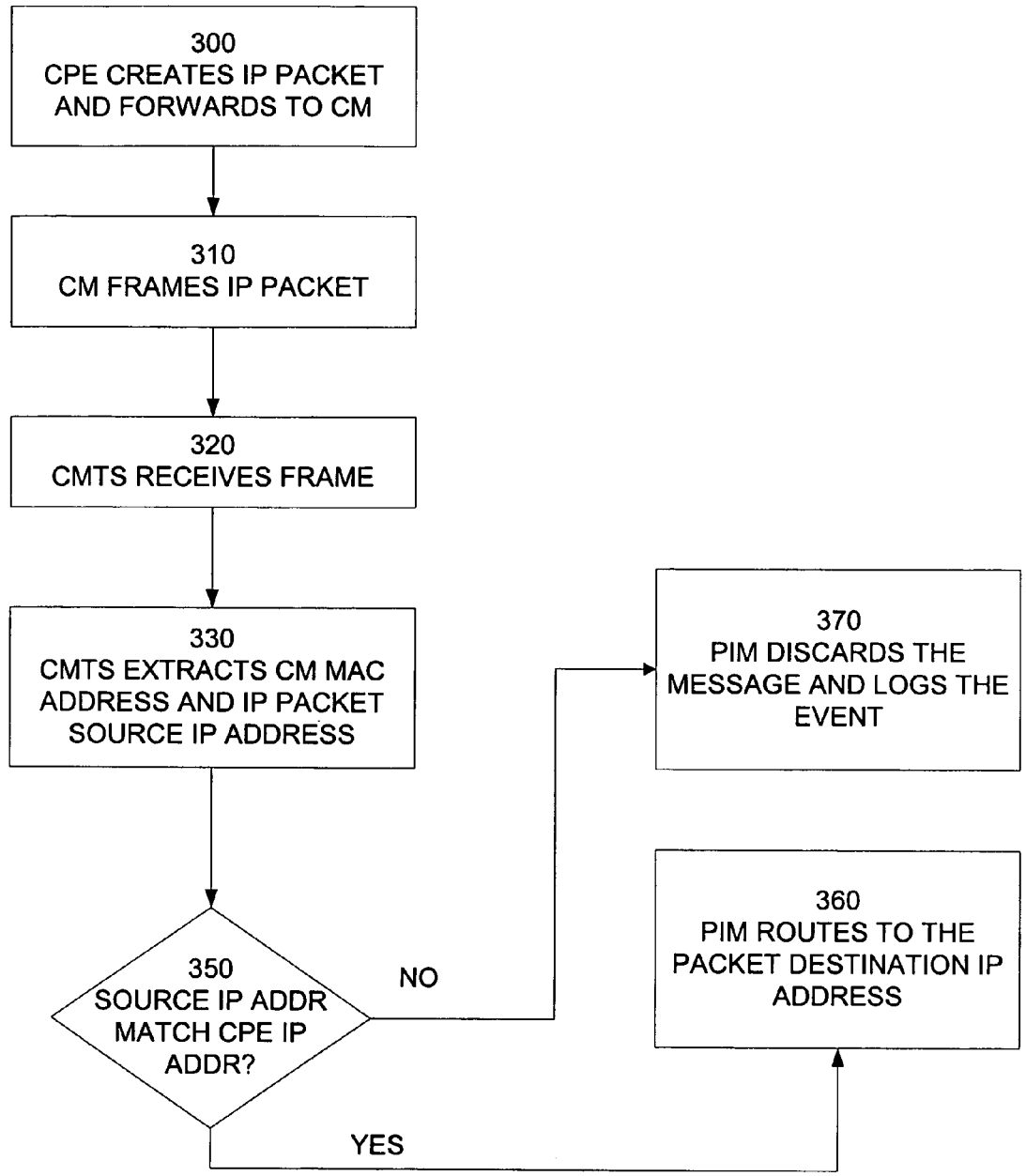
FIG. 3 illustrates a general flow of a method of identifying spoofed IP source addresses in upstream packets using data acquired from the CPE DHCP request/offer/acceptance exchange.

FIG. 3 illustrates a general flow of a method of identifying spoofed IP source addresses in upstream packets using data acquired from the CPE DHCP request/offer/acceptance exchange. Referring to FIG. 3, a CPE creates an IP packet and forwards it to the CM for transmission 300. The IP packet comprises the source IP address of the CPE. The CM frames the IP packet for transmission over the DCN 310. The frame comprises the MAC address of the CM from which the frame originates. The frame comprising the IP packet is received by CMTS 320. The CMTS extracts the MAC address of the CM from the frame and the source IP address from the IP packet 330. The CMTS determines whether the source IP address of the packet matches an IP address of the CPE "known" to be associated with the CM from which the frame containing the IP packet originated 350. As previously noted, a CM may be associated with one or more CPEs. If the source IP address of the packet matches any of the CPE IP address associated with CM MAC address, the CMTS routes the packet to the packet destination IP address 360. If the header source IP address of the packet does not match any of the CPE IP addresses associated with CM MAC address, the CMTS discards the message and logs the event 370.

By inspecting packets for authorized source IP addresses, the CMTS substantially eliminates deployment of the resources of the DCN in a DoS attack that depends on a spoofed source IP address. This means that the source IP address of packets reaching the edge server (see FIG. 1, 140) of the DCN may be presumed to be the actual IP address of the CPE from which the packets originated (i.e., no spoofing). If a DoS attack from within the DCN is detected by attack detection system 145, by inference the CPE source of the packets used to mount the attack is either operated by attacker or has been subverted by an attacker. Thus, remedial action can be taken against the source of the attack packets without concern that the remedial action is being directed against an innocent or uncorrupted source (as would be the case if the source IP address had been spoofed).

Figure 4:
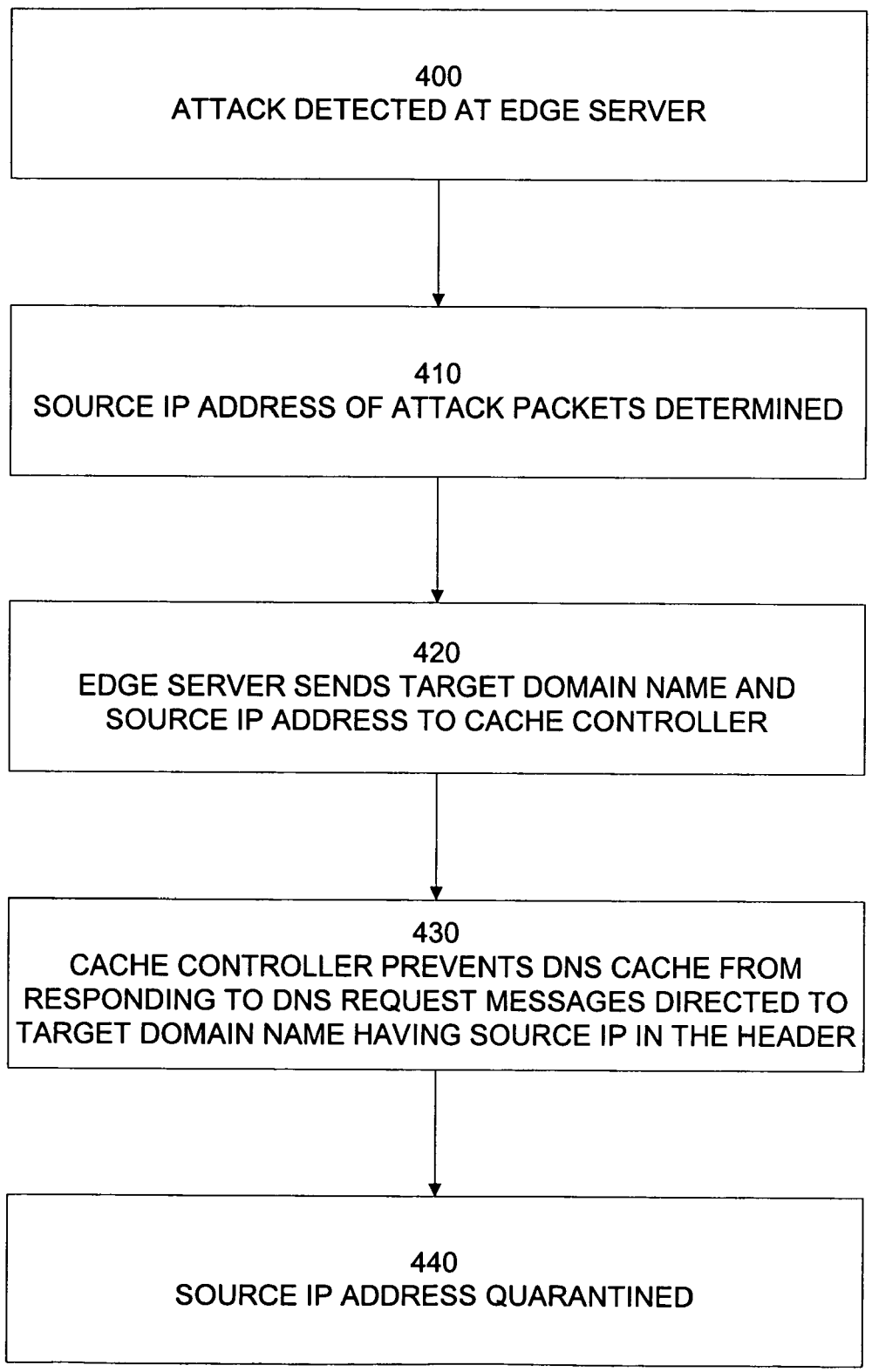
FIG. 4 illustrates a process by which remedial action is taken against a source IP address involved in a DoS attack according to embodiments of the present invention.

FIG. 4 illustrates a process by which remedial action is taken against a source IP address involved in a DoS attack according to embodiments of the present invention. As previously discussed, a DoS attack begins with a DNS request sent by an attacking computer to a DNS server. Referring again to FIG. 1, local DNS cache server 135 provides means for storing recently accessed Internet websites and their IP addresses. When a domain name request is made for a remote Internet website, the request is first sent to a local DNS cache server 135. Local DNS cache server 135 looks to see if the remote Internet website is already listed in its cache. If this is the case, a local DNS cache server 135 responds with the IP address. Only if the remote Internet website is not listed in the cache is a domain name request forwarded to remote DNS server 160. The response from remote DNS server 160 is then added, on a temporary basis, to local DNS cache server 135. In this manner data traffic between the cable network and remote networks is reduced. During a DoS attack, an attacker will send a continuous stream of messages to the local DNS cache server.

In an embodiment of the present invention, a DoS attack is thwarted by preventing an attacker from receiving a response to a DNS request message for the DNS cache server. Referring to FIG. 4, a DoS attack is detected at an edge server by an attack detection system 400. The source IP address of the attack packets is determined 410. The target domain name and the source IP address are sent by the edge server to a cache controller 420. The cache controller prevents the DNS cache server from responding to a DNS request message directed to the target domain name having the source IP address of the attack packets in the message header 430. The source IP address used in the attack packets is quarantined 440. According to embodiments of the present invention, a "quarantine" may comprise various steps to thwart an attack in progress and to prevent additional attacks. By way of illustration and not as a limitation, the subscriber assigned the quarantined source IP address may be notified to determine whether the subscriber is initiating the attack willingly or if the subscriber's CPE has been captured by an attacker. Alternatively or additionally, the quarantined IP address may be precluded from making requests to the DNS cache server for a period of time. Alternatively or additionally, the CPE associated with the quarantined IP address may be assigned a new IP address and the new IP address may be monitored to determine if attacks continue. As will be apparent to those skilled in the art, other actions may be taken with respect to quarantined IP address without departing from the scope of the present invention.

Figure 5:
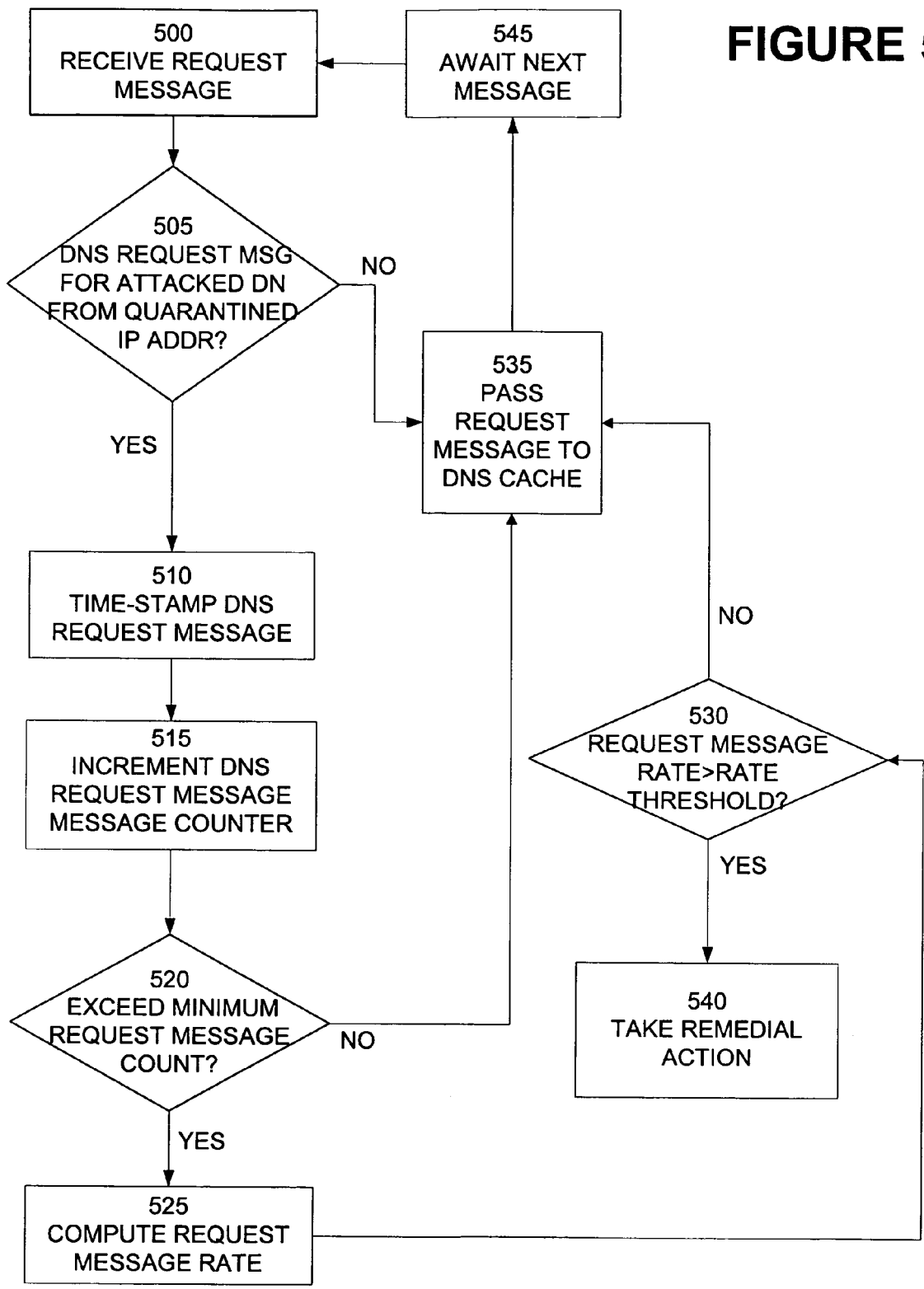
FIG. 5 illustrates a flow diagram in which a cache controller is used to determine a DNS message rate based on an elapsed time according to embodiments of the present invention.

In another embodiment of the present invention, a quarantined source IP address is allowed to make unrestricted requests to the DNS cache server on a "probationary" basis subject to monitoring of domain name request directed to the domain name that caused the IP address to be quarantined. FIG. 5 illustrates a flow diagram in which a cache controller is used to determine a DNS message rate based on an elapsed time according to embodiments of the present invention. Referring now to FIG. 5, the cache controller receives a domain name request 500. The cache controller determines whether the domain name request directed to a particular domain name and originates from a quarantined IP address 505. If a request is not directed to a particular domain name or is not from a quarantined IP address, the request is passed to the DNS cache server 535. The process continues with the cache controller awaiting the next message 545. If a request directed to a particular domain name is received from a quarantined IP address is received, the cache controller time-stamps the DNS request message 510 and a DNS request message counter incremented by one 515. A determination is made if a minimum number of DNS request messages directed to a particular domain name have been sent from the quarantined IP address 520. A small number of DNS request messages sent over a short period of time might otherwise result in a high DNS request message rate that is not indicative of the actual DNS request message rate originating from an IP address. If the minimum number of DNS request messages sent from a quarantined IP address is not exceeded, then the last DNS request message is forwarded to the DNS cache server for handling 535 and cache controller waits for the next DNS request message 545.

If the minimum number of DNS request message sent is exceeded for a quarantined IP address, the cache controller determines a DNS request message rate 525 for the quarantined IP address based on the time-stamp data of the DNS request message represented by DNS request message count 1 (the first DNS request message). The time represented by the time stamp of the first message is subtracted from the time represented by the timestamp of the newly arrived message (DNS request message "n") to compute the time period over which the "nth" message arrived. The DNS request message rate is determined by dividing "n" by the computed time period.

The cache controller determines whether the DNS request message rate exceeds a DNS request message rate threshold 530. If the DNS request message rate does not exceed the DNS request message rate threshold, the DNS request message is forwarded to the DNS cache server for handling 535. The process continues with the cache controller awaiting the next message 545. If the DNS request message rate exceeds the DNS request message rate threshold, remedial action is taken 540.

In one embodiment of the present invention, the remedial action is to discard the DNS request message and to block all future DNS request messages for the specific name from the quarantined IP address. In another embodiment of the present invention, the remedial action is to send a warning to the quarantined IP address before blocking the DNS request messages from the quarantined IP address. In yet another embodiment of the present invention, the DNS controller queues the DNS request message for sending at a later time to assure that the DNS request message rate will drop below the DNS request message rate threshold. In yet another embodiment of the present invention, if the number of DNS request messages in queue from a particular quarantined IP address exceeds a queue threshold value, the DNS request messages are discarded. As will be apparent to those skilled in the art, other remedial actions may be taken in the event that the DNS request message rate exceeds the DNS request message rate threshold without departing from the scope of the present invention.

In another embodiment of the present invention, the DNS request message rate is computed using a clock that runs for an interval and then is reset. DNS request messages are counted during the interval and the DNS request message rate (DNS request messages per interval) is the DNS request message count.

Figure 6A:
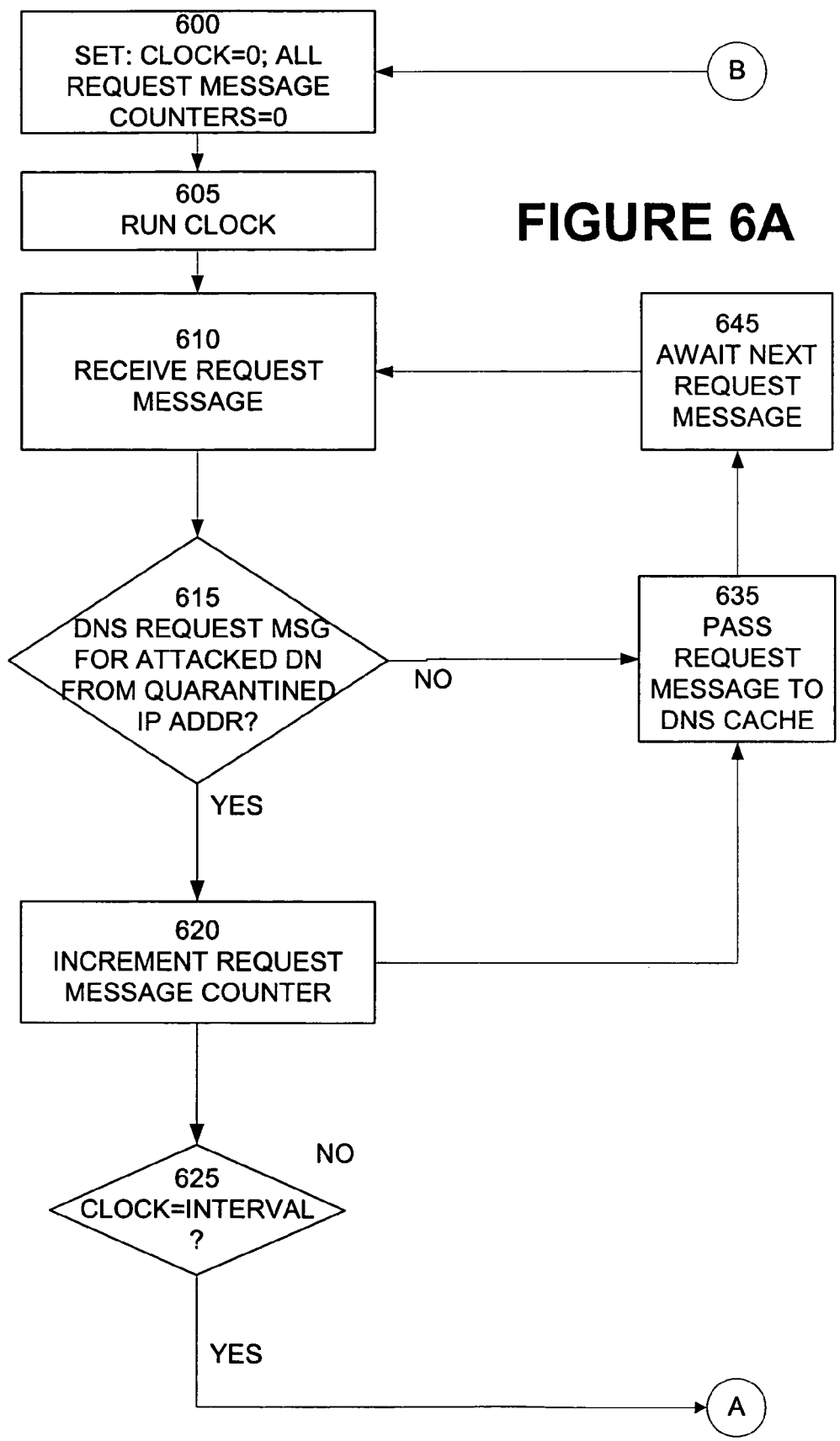
FIGS. 6A and 6B illustrate a flow diagram in which a cache controller is used to determine a DNS message rate based on a clock interval according to embodiments of the present invention.
Figure 6B:
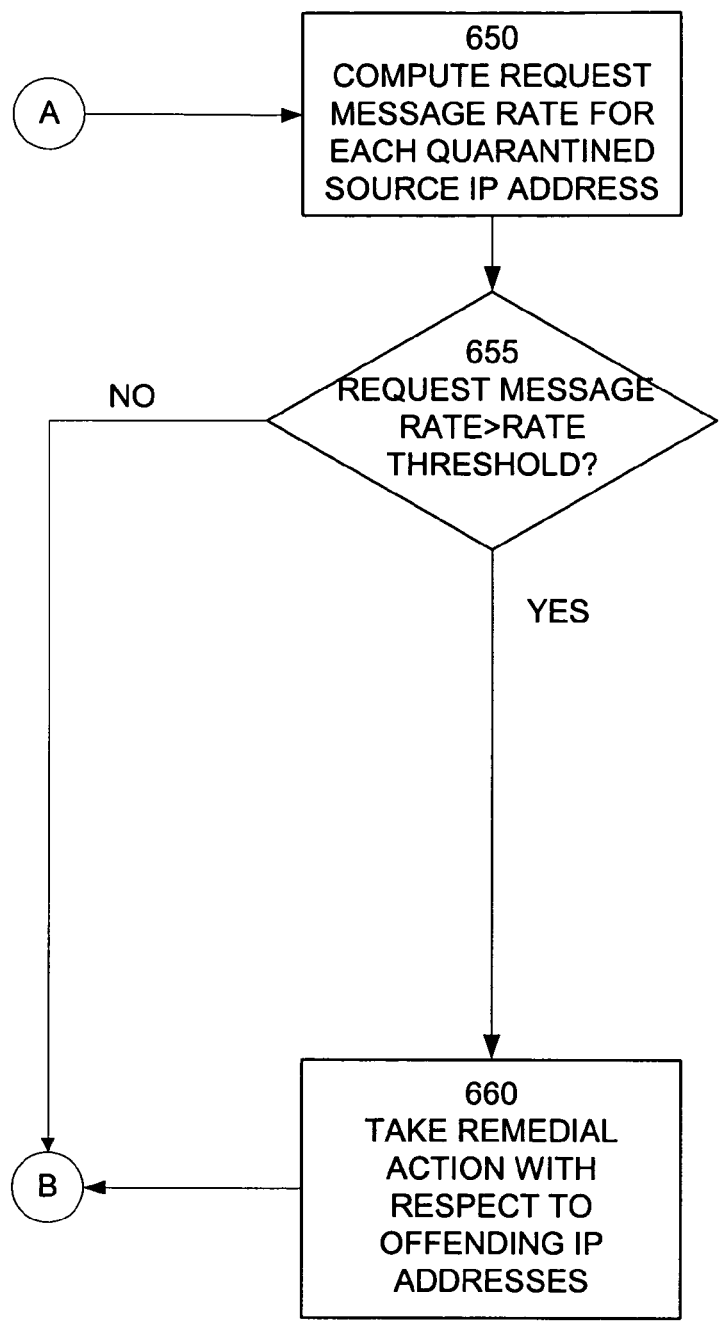

FIGS. 6A and 6B illustrates a flow diagram in which a cache controller is used to determine a DNS message rate based on a clock interval according to embodiments of the present invention. Referring now to FIG. 6A, a clock and all DNS request message counters within a cache controller are set to zero 600. The clock is started 605. The cache controller receives a domain name request 610. The cache controller determines whether the domain name request directed to a particular domain name and originates from a quarantined IP address 615. If a request is not directed to a particular domain name or is not from a quarantined IP address, the request is passed to the DNS cache server 635. The process continues with the cache controller awaiting the next message 645. If a request directed to a particular domain name is received from a quarantined IP address is received, the cache controller increments a request message counter by one 620. A determination is made if a clock interval has been reached 625. If the clock interval has not been reached, the DNS request message is forwarded to the DNS cache server for handling 635 and the cache controller waits the next DNS request message 645.

Referring now to FIG. 6B, if the clock interval has been reached, then DNS request message rate is computed 650 for each quarantined IP address subject to monitoring by the cache controller. The DNS message rate is the number of DNS messages directed to a specified domain name from a quarantined IP address during an interval. The DNS request message rate for each monitored quarantined IP address is compared to the DNS request message rate threshold 655. For those quarantined IP address for which the DNS request message rate exceeds the DNS request message rate threshold, remedial action is taken 660. The clock and request message counters are set to zero 600 and the process starts over.

In one embodiment of the present invention, the remedial action is to discard the DNS request message and to block all future DNS request messages for the specific name from the quarantined IP address. In another embodiment of the present invention, the remedial action is to send a warning to the quarantined IP address before blocking the DNS request messages from the quarantined IP address. In yet another embodiment of the present invention, the DNS controller queues the DNS request message for sending at a later time to assure that the DNS request message rate will drop below the DNS request message rate threshold. In yet another embodiment of the present invention, if the number of DNS request messages in queue from a particular quarantined IP address exceeds a queue threshold value, the DNS request messages are discarded. As will be apparent to those skilled in the art, other remedial actions may be taken in the event that the DNS request message rate exceeds the DNS request message rate threshold without departing from the scope of the present invention.

In another embodiment of the present invention, the DNS request message count is accumulated over a number of intervals and a second DNS request message rate is determined over the multiple intervals. The second DNS request message rate is measured against a second DNS request message rate threshold to determine if remedial action should be taken. In this way, the present invention can limit DNS request message in terms of both a short time interval and a long time interval.

In still another embodiment of the present invention, domain name requests directed to a particular domain name and received from a quarantined IP address are buffered so as to forward the requests to the DNS cache server only after a fix interval has expired.

As previously described, a method of identifying spoofed IP source addresses in upstream packets uses data acquired from the CPE DHCP request/offer/acceptance exchange to relate an IP address assigned to a CPE with the MAC address of the CM to which the CPE is connected. In an alternate embodiment, the mapping of a CPE IP address to a CM MAC address is uses information acquired by the CMTS during registration and during a request to transmit issued by the CM to the CMTS.

Each time a CM is powered-on or reset, it must be initialized through a series of "handshakes" and transfers of data between itself and a CMTS at the cable headend. Following initialization, the CM is then authenticated to confirm that the CM is entitled to receive service. An authenticated CM is configured as an Internet device. During this process, the CM synchronizes its clock with that of the CMTS and obtains an Internet protocol (IP) address from a DHCP server. The DHCP server also provides the CM the network address of a Trivial File Transfer Protocol (TFTP) server and where a device boot file for that modem can be found and downloaded. The CM requests its device boot file by the sending the TFTP a request message comprising a device boot file filename. Upon receipt of the boot file, the CM sends a registration request (REG-REQ) to the CMTS. This REG-REQ includes the current service identification (SID), IP address, operational parameters, upstream and downstream channel IDs, time stamps, and other configuration settings. If the information is accepted, the CMTS responds with a new SID and completes the registration process.

The IP address assigned to the CM is a private IP address that allows the CM to communicate with other addressable devices on the DCN. Additionally, a public IP address is assigned to one or more CPEs connected to the CM. This assignment results from a CPE DHCP request sent by a CPE on boot-up of the CPE through the CM to a CPE DHCP server located at the headend. The CPE IP address is sent to the CPE in a CPE offer. The CPE responds with an acceptance response that is forwarded through the CMTS to the CPE DHCP server. The CMTS keeps track of each CPE IP address associated with a specific CM.

Referring again to FIG. 1, in order for a CM to send data upstream (toward the Internet), the CMTS must grant the CM a bandwidth slot in which the CM may send a data message. A CM makes requests to the CMTS. The CM issues a grant using a MAP message. The CM then transmits in the assigned slots during the grant period. Included in the data exchanged during this negotiation is the SID that is unique to the CM. Thus, the CMTS can determine the source of any packet and can associate the source with a source IP address of the CPE that created.

FIG. 7 illustrates a general flow of a method of identifying spoofed IP source addresses in upstream packets using data acquired from a time slot grant according to embodiments of the present invention. Referring to FIG. 7, a CM sends a request to transmit to a CMTS 700. The request to transmit comprises the SID of the CM as issued by the CMTS during the initialization process. The CMTS issues a grant to the requesting CM using a MAP message and passes the grant information to a packet inspection module (PIM) 705. The grant instructs the CM of its allocation of time slots in the TDMA scheme used by the DCN.

The PIM uses the SID from the grant information and queries a SID/IP database for the IP addresses of the CPEs associated with the CM identified by the SID in the grant 715. In this way, the PIM "learns" the IP addresses of all of the CPEs from which IP packets may be sent in a particular time slot prior to the packets actually being sent by the CM.

The CM sends IP packets in the allocated slots 720. The CMTS extracts the CM MAC address and the IP packet source address 725. The CMTS forwards the CM MAC address and the IP packet source address to the PIM 730. The PIM determines whether the source IP address of the packet matches any of the IP address of the CPEs "known" to be associated with the CM that was granted the time slot in which the IP packets were sent 735. If the source IP address matches a CPE IP address associated with CM MAC address, the CMTS routes the packet to the packet destination IP address 740. If the source IP address does not match any of the CPE IP address associated with CM MAC address, the CMTS discards the message and logs the event 745. By inspecting packets for CPE source IP addresses, the PIM substantially eliminates the use of the resources of the DCN to mount an attack that depends on a spoofed source IP address. Because the valid CPE source IP addresses for a packet are determined prior to the sending of the packet, the overhead burden on the CMTS and the normal routing functions performed by the CMTS are minimized.

Systems and methods for provisioning thwarting denial of service attacks originating in a DOCSIS-compliant cable network have been disclosed. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A method for thwarting a denial of service attack originating from a DOCSIS-compliant cable network (DCN) comprising:

detecting transmission of a packet used to perpetrate a denial of service attack against a target originating from a customer premises equipment (CPE) connected to the DNS;

capturing a source IP address of the CPE and a domain name of the target from the attack packet; and directing a DNS cache server to ignore a domain name request from the CPE comprising the source IP address and the target domain name, wherein the DNS cache server is used to thwart the denial of service attack directed to the target domain name from the CPE.

2. The method of claim 1, wherein detecting the occurrence of a denial of service attack against a target originating from a customer premises equipment (CPE) comprises evaluating network statistical data to identify anomalies in IP traffic that are indicative of a denial of service attack.

3. The method of claim 1 further comprising:

receiving a packet at a cable modem termination system (CMTS) from the CPE, wherein the CPE is connected to a cable modem, wherein the CPE is assigned an IP address, wherein the cable modem comprises a unique MAC address, and wherein the packet comprises a MAC address of the cable modem and the assigned IP address of the CPE;

determining if the MAC address of the modem and the assigned IP address of the CPE in the packet match a stored MAC/IP address pair;

if the MAC address of the modem and the assigned IP address of the CPE in the packet do not match a stored MAC/IP address pair, then discarding all packets having the unauthorized packet source IP address; and if the MAC address of the modem and the assigned IP address of the CPE in the packet match a stored MAC/IP address pair, then forwarding the packet.

4. The method of claim 1, wherein the CPE is a general-purpose computer.

5. The method of claim 1 further comprising:

determining whether a preset time period has expired since the DNS cache server was directed to ignore the domain name request from the CPE comprising the source IP address and the target domain name; and if the preset time period has expired, then directing the DNS cache server to process the domain name request from the CPE comprising the source IP address and the target domain name.

6. The method of claim 1 further comprising:

assigning the CPE a new source IP address;

monitoring a rate of domain name requests comprising the new source IP address;

determining if the rate of domain name requests comprising the new source IP address is indicative of a denial of service attack originating from the CPE; and if the rate of domain name requests comprising the new source IP address is indicative of a denial of service attack, then directing the DNS cache server to ignore the domain name requests from the CPE comprising the new source IP address.

7. A method for limiting domain name service (DNS) request messages originating from within a DOCSIS-compliant cable network (DCN) comprising:

receiving a DNS request message directed to a domain name from a customer premises equipment (CPE);

obtaining the source IP address of the CPE and the domain name from the DNS request message;

calculating a DNS request message transmission rate for DNS request messages directed to the domain name from the source IP address;

comparing the DNS request message transmission rate to a threshold DNS message transmission rate, wherein the DNS message threshold rate establishes a maximum number of DNS request messages directed to a same domain name from a same source IP address over a period of time; and in the event the DNS request message transmission rate exceeds the threshold DNS message transmission rate, directing a DNS cache server to ignore a domain name request from the CPE comprising the assigned IP address and the target domain name, wherein the DNS cache server is used to thwart the denial of service attack directed to the target domain name from the CPE.

8. The method of claim 7, wherein calculating a DNS request message transmission rate from the source IP address comprises:

time-stamping a first DNS request message and a last DNS request message directed to the domain name from the source IP address;

counting the DNS request messages from the source IP inclusive of the first DNS request message directed to the domain name and the last DNS request message directed to the domain name;

determining an elapsed time segment between the first and last DNS request messages by computing the difference between the time-stamp of the last DNS request message and the first DNS request message; and calculating the DNS request message transmission rate for the source IP address by dividing the DNS request message count by the elapsed time segment.

9. The method of claim 7, wherein calculating a DNS request message transmission rate for the source IP address comprises:

counting the DNS request messages directed to the domain name from the source IP address during a clock interval; and setting the DNS request message transmission rate to the message count.

10. The method of claim 7, wherein the CPE is a general-purpose computer.

11. The method of claim 7 further comprising:

receiving a packet at a cable modem termination system (CMTS) from the CPE, wherein the CPE is connected to a cable modem, wherein the CPE is assigned an IP address, wherein the cable modem comprises a unique MAC address, and wherein the packet comprises a MAC address of the cable modem and the assigned IP address of the CPE;

determining if the MAC address of the modem and the assigned IP address of the CPE in the packet match a stored MAC/IP address pair;

if the MAC address of the modem and the assigned IP address of the CPE in the packet do not match a stored MAC/IP address pair, then discarding all packets having the unauthorized packet source IP address; and if the MAC address of the modem and the assigned IP address of the CPE in the packet match a stored MAC/IP address pair, then forwarding the packet.

12. The method of claim 7 further comprising:

determining whether a preset time period has expired since the DNS cache server was directed to ignore the domain name request from the CPE comprising the source IP address and the target domain name; and if the preset time period has expired, then directing the DNS cache server to process the domain name request from the CPE comprising the source IP address and the target domain name.

13. The method of claim 7 further comprising:

assigning the CPE a new source IP address;

monitoring a rate of domain name requests comprising the new source IP address;

determining if the rate of domain name requests comprising the new source IP address is indicative of a denial of service attack originating from the CPE; and if the rate of domain name requests comprising the new source IP address is indicative of a denial of service attack, then directing the DNS cache server to ignore the domain name requests from the CPE comprising the new source IP address.

14. A system for thwarting a denial of service attack originating from a DOCSIS-compliant cable network (DCN) comprising:

a DNS cache server comprising instructions from responding to domain name requests from a customer premises equipment (CPE) connected to the DCN;

an edge server, wherein the edge server comprises instructions for receiving an IP packet from the CPE that is destined for delivery to a site connected to the Internet, wherein the site is identified by a domain name associated with a unique IP address;

an attack detection system connected to the edge server, wherein the attack detection system comprises instructions for:

detecting the occurrence of a denial of service attack against a target originating from the CPE; and capturing the source IP address of the CPE and a domain name of the target of the denial of service attack;

a cache controller connected to the attack detection system and to the DNS cache server, wherein the cache controller comprises instructions for:

receiving from the attack detection system the source IP address of the CPE and the target domain name; and directing a DNS cache to ignore a domain name request from the CPE that is directed to the target domain name, wherein the DNS cache server is used to thwart the denial of service attack directed to the target domain name from the CPE.

15. The system of claim 14, wherein the CPE is a general-purpose computer.

16. The system of claim 14, wherein CPE is connected to the DCN via a cable modem, wherein the system further comprises a cable modem termination system (CMTS), and wherein the CMTS comprises instructions for:

receiving a packet from the CPE, wherein the CPE is connected to the cable modem, wherein the CPE is assigned an IP address, wherein the cable modem comprises a unique MAC address, and wherein the packet comprises a MAC address of the cable modem and the assigned IP address of the CPE;

determining if the MAC address of the modem and the assigned IP address of the CPE in the packet match a stored MAC/IP address pair;

if the MAC address of the modem and the assigned IP address of the CPE in the packet do not match a stored MAC/IP address pair, then discarding all packets having the unauthorized packet source IP address; and if the MAC address of the modem and the assigned IP address of the CPE in the packet match a stored MAC/IP address pair, then forwarding the packet.

17. The system of claim 14, wherein the DNS cache server further comprises instructions for:
- determining whether a preset time period has expired since the DNS cache server was directed to ignore the domain name request from the CPE comprising the source IP address and the target domain name; and
- if the preset time period has expired, then directing the DNS cache server to process the domain name request from the CPE comprising the source IP address and the target domain name.

18. The system of claim 14, wherein system further comprises means for assigning the CPE a new source IP address and wherein the cache controller comprises instructions for:
- monitoring a rate of domain name requests comprising the new source IP address;
- determining if the rate of domain name requests comprising the new source IP address is indicative of a denial of service attack originating from the CPE; and
- if the rate of domain name requests comprising the new source IP address is indicative of a denial of service attack, then directing the DNS cache server to ignore the domain name requests from the CPE comprising the new source IP address.

* * * * *